United States Patent [19]
Wheless

[11] 3,972,341
[45] Aug. 3, 1976

[54] SHUTOFF AND EXHAUST VALVE FOR AIR BRAKES

[75] Inventor: William B. Wheless, Owosso, Mich.

[73] Assignee: Midland-Ross Corporation, Cleveland, Ohio

[22] Filed: July 14, 1975

[21] Appl. No.: 595,581

[52] U.S. Cl. .................................... 137/102; 303/40
[51] Int. Cl.² ........................................ F16K 31/42
[58] Field of Search ............... 137/102; 303/28, 40, 303/68, 67

[56] References Cited
UNITED STATES PATENTS

| | | |
|---|---|---|
| 2,859,763 | 11/1958 | Fites .................... 137/102 |
| 3,093,153 | 6/1963 | Horowitz ................ 137/102 |
| 3,183,919 | 5/1965 | Herring ................. 137/102 |

Primary Examiner—Henry T. Klinksiek
Attorney, Agent, or Firm—H. Duane Switzer

[57] ABSTRACT

A shutoff and exhaust valve for tractor-trailer air brake systems operates to open or close communication between the tractor and trailer service lines in accordance with the pressure in the tractor emergency line and the trailer service line is exhausted to atmosphere through the same valve.

19 Claims, 5 Drawing Figures

3,972,341

SHUTOFF AND EXHAUST VALVE FOR AIR BRAKES

BACKGROUND OF THE INVENTION

This application pertains to the art of valves and, more particularly, to valves for use on vehicle air brake systems. The invention is particularly applicable for use on tractor-trailer air brake systems and will be described with particular reference thereto. However, it will be appreciated that the invention has broader aspects and the valve may be used in other systems.

Tractor-trailer air brake systems commonly include a shutoff valve between the tractor and trailer lines for shutting off flow of service air from the tractor service line to the trailer service line when the trailer is not connected, or when the trailer emergency line breaks. The shutoff valve is normally moved to an open position for establishing flow between the tractor and trailer service lines by pressure supplied to the valve from the tractor emergency line. Subsequent to a brake application, air bleeds from both the tractor and trailer service lines through the foot control valve. Bleeding the air from the trailer service line back to the foot control valve delays complete release of the trailer brakes.

One valve of the type described for tractor-trailer air brake systems is disclosed in U.S. Pat. No. 3,183,919 issued May 18, 1965, to Herring. Examples of combined shutoff and exhaust valves include those disclosed in U.S. Pat. Nos. 2,816,563 issued Dec. 17, 1957, to Pappas and 3,428,071 issued Feb. 18, 1969, to Kobnick. These valves do not incorporate a positive shutoff operable in accordance with the pressure in the emergency line. In addition, the structure of the valves is relatively complicated.

SUMMARY OF THE INVENTION

A tractor-trailer air brake system having tractor emergency and service lines, and trailer emergency and service lines, includes a combined shutoff and exhaust valve connecting the tractor and trailer emergency lines, and the tractor and trailer service lines.

The shutoff and exhaust valve has a movable piston which moves between a first position blocking communication between the tractor and trailer service lines, and a second position for providing communication between the service lines. The piston is normally biased to its first position and is movable to its second position under influence of predetermined pressure acting thereon through the tractor emergency line.

The valve has an exhaust port through the piston for establishing communication of the trailer service line with atmosphere. Diaphragm valve means positioned between the tractor and trailer service lines and the exhaust port is operative in the second position of the piston to establish communication between the service lines while blocking communication of the service lines with the exhaust port upon application of a higher to lower pressure differential across the diaphragm valve means from the tractor service line to the trailer service line. The valve means is operative in the second position of the piston to block communication between the service lines while establishing communication between the trailer service line and the exhaust port upon application of a higher to lower pressure differential across the diaphragm valve means from the trailer service line to the tractor service line.

In a preferred arrangement, the diaphragm valve means includes a circumferential lip extending outwardly therefrom and engaging a surface of the valve. This lip increases the sensitivity of the valve and prevents chattering.

In accordance with another aspect of the invention, a second outwardly extending circumferential lip on the diaphragm valve means engages a surface of the valve between the tractor and trailer service lines, and between the tractor service line and the exhaust port for minimizing vibration of the valve and increasing the sensitivity of the valve.

It is a principal object of the present invention to provide an improved shutoff and exhaust valve.

It is a further object of the invention to provide such a valve having enhanced sensitivity for rapidly exhausting a trailer service line to atmosphere when a very low pressure differential exists across a diaphragm valve means.

It is an additional object of the invention to provide such a valve in which vibration is minimized.

DESCRIPTION OF A PREFERRED EMBODIMENT

Figure 1:
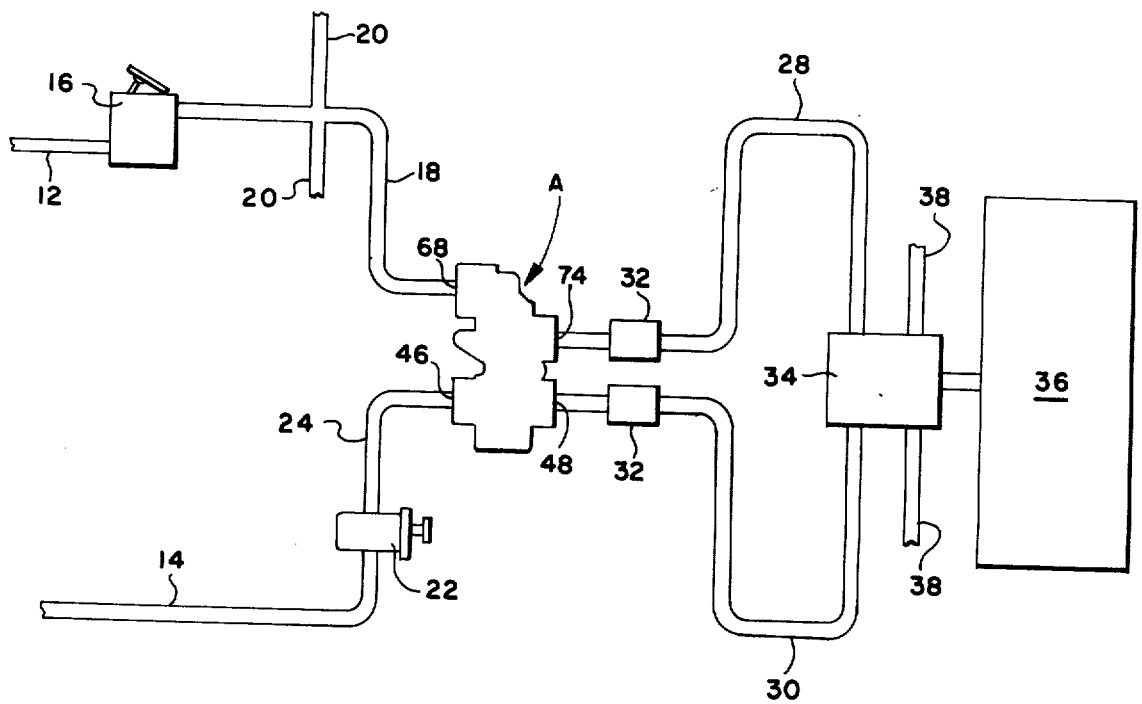
FIG. 1 is a schematic illustration of a tractor-trailer air brake system having the improved valve of the present application incorporated therein.

With reference to FIG. 1, air supply lines 12 and 14 are connected with suitable air reservoirs which are charged by an engine driven air pump in a known manner. A foot control valve 16 connects supply line 12 with tractor service line 18 connected with combined shutoff and exhaust valve A and having brake lines 20 leading to power units for applying the tractor brakes. Supply line 14 is connected by a dash valve 22 with tractor emergency line 24 also connected with combined shutoff and exhaust valve A.

Trailer service and emergency lines 28 and 30 are connected as by couplings 32 with tractor service and emergency lines 18 and 24 through valve A. Trailer emergency line 30 is also connected with emergency relay valve 34 and trailer air reservoir 36. Trailer service line 28 is also connected with relay valve 34 and trailer brake lines 38 connected to power units for applying the trailer brakes.

When the tractor and trailer lines have been connected, dash valve 22 is opened for supplying air through valves A and 34 to trailer air reservoir 36. When the pressure in line 24 has built up to a predetermined pressure, valve A opens for establishing communication between tractor and trailer service lines 18 and 28. Operation of foot control valve 16 will then supply air to lines 18 and 28 for applying the tractor and trailer brakes. When foot valve 16 is closed, air in line 18 between valve A and foot control valve 16 bleeds to atmosphere through foot control valve 16. At the same time, air in trailer service line 28 bleeds to atmosphere through combined shutoff and exhaust valve A.

Figure 2:
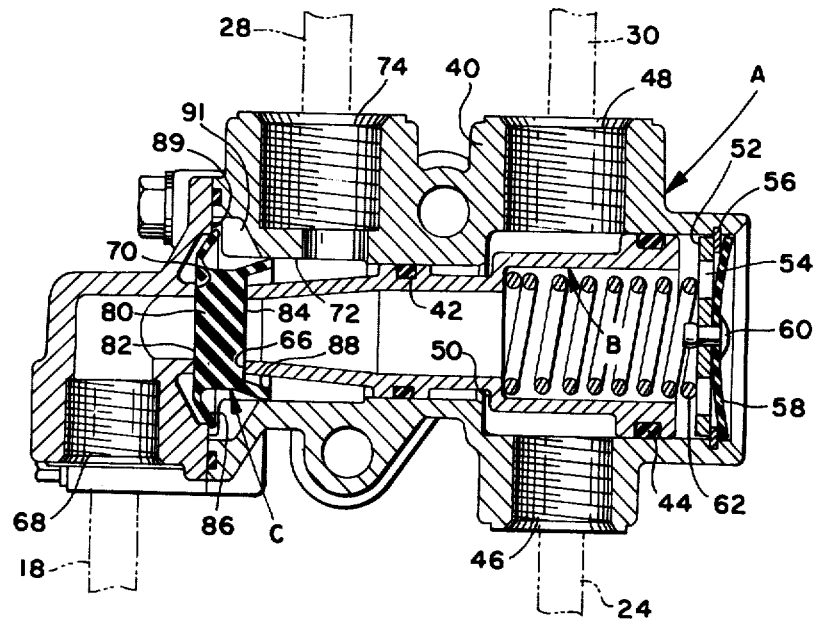
FIG. 2 is a cross-sectional elevational view of the improved valve in a shutoff position.

With reference to FIG. 2, combined shutoff and exhaust valve A includes a valve body or housing 40 having a cavity in which a hollow piston B is reciprocatingly received. Piston B has seals 42 and 44 on opposite sides of first and second valve ports 46 and 48, and a stepped portion 50 between the seals.

A plate 52 having openings 54 therethrough is retained in the piston cavity of valve A by a snap ring 56 positioned in a suitable circumferential groove. A highly flexible diaphragm 58 of rubber or the like is secured to plate 52 by fastener 60 for preventing the entrance of dirt and moisture into the valve. A coil spring 62 acts between piston B and plate 52 for normally biasing piston B to the left in FIG. 2 to a first position.

One end of hollow piston B is effectively open to atmosphere through holes 54 in plate 52 and past diaphragm 58, while the other open end 66 bears against valve means C in the form of a diaphragm valve member of flexible elastomeric material such as rubber or the like. A third valve port 68 is communicable past a valve seat 70, valve C and through a cylindrical bore 72 with a fourth valve port 74.

Valve member C includes a body portion 80 having opposite sides 82 and 84. A first circumferential lip 86 extends generally radially outwardly from body portion 80 adjacent side 82. A second lip 88 is of smaller outer diameter than lip 86 and is generally in the form of a truncated cone. Lip 88 extends longitudinally and radially outwardly from body portion 80 adjacent side 84. Second lip 88 preferably extends outwardly from the longitudinal axis of valve C at an included acute angle substantially less than 90°.

With piston B in its first position of FIG. 2, open piston end 66 is seated against side 84 of valve C, while side 82 of valve C is seated against seat 70. First circumferential lip 86 engages a circumferential surface 89 of valve body 40 outwardly of seat 70 and longitudinally-spaced from seat 70, and is stressed by being axially bent as shown in FIG. 2. A plurality of circumferentially-spaced ribs 91 are spaced from surface 89 a distance slightly greater than the thickness of lip 86, and the spaces between ribs 91 provide flow of air past lip 86 when such lip moves away from surface 89. Second circumferential lip 88 engages bore 72, and is positioned between ports 68 and 74, and between port 68 and piston end 66.

Figure 3:
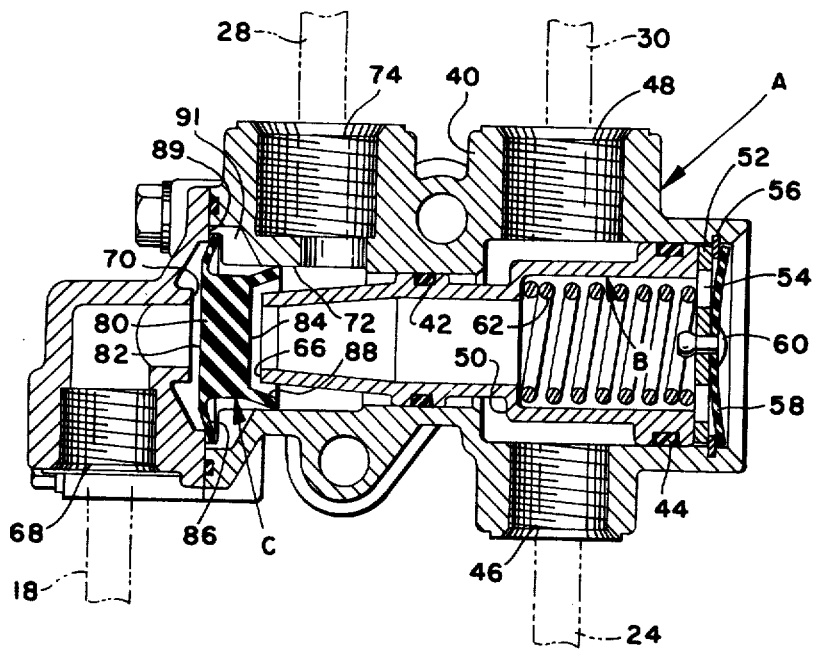
FIG. 3 is a view similar to FIG. 2 showing the valve in an armed position.

Ports 46 and 48 are respectively connected to tractor emergency line 24 and trailer emergency line 30. Ports 68 and 74 are respectively connected to tractor service line 18 and trailer service line 28. When the pressure acting through port 46 reaches a predetermined value, the pressure acting on the differential area of piston B between seals 42 and 44 causes piston B to shift to the right to its second position as shown in FIG. 3.

When piston B moves to the right, valve C may move away from seat 70 due to the stress in lip 86. On the other hand, valve C may remain in the position of FIG. 2 when the piston moves to the right, or may follow the piston. The exact nature of what happens to valve C when piston B moves to the right is not of critical importance. For convenience of illustration, valve C is shown in FIG. 3 as being moved away from seat 70 when piston B shifts to the right to the armed position of valve A.

Figure 4:
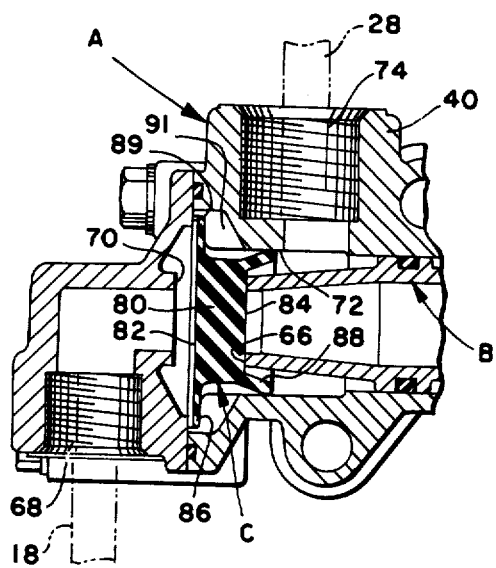
FIG. 4 is a partial view similar to FIGS. 2 and 3, and showing the valve in a position wherein air is being supplied from the tractor service line to the trailer service line.

When foot control valve 16 is opened, a higher to lower pressure differential is created across valve C from port 68 to port 74 so that air flows past highly flexible lips 86 and 88 from port 68 to port 74. At the same time, air pressure acting against side 82 of valve C snaps same to the position of FIG. 4 and firmly engages side 84 thereof with piston end 66. Lip 86 engages ribs 91 to stabilize the valve and prevent vibration of same.

Figure 5:
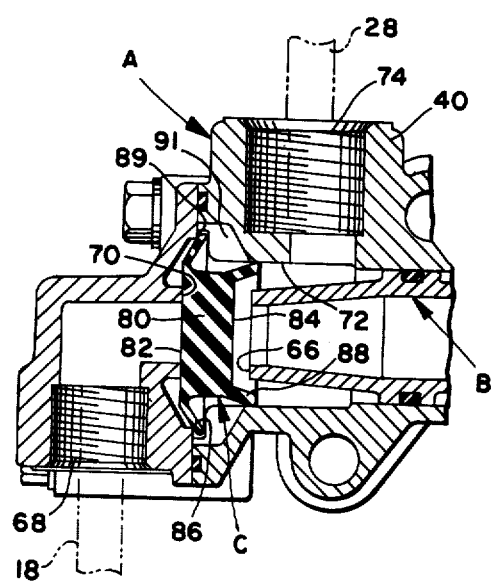
FIG. 5 is a partial view similar to FIG. 4, and showing the valve in a position wherein air is being exhausted to atmosphere from the trailer service line.

When foot control valve 16 is closed, air in line 18 and port 68 bleeds off to atmosphere through foot control valve 16. This creates a higher to lower pressure differential across valve C from port 74 to port 68 so that the air pressure acting on valve C within the area of lip 88 will move valve C toward seat 70 to the position of FIG. 5 for opening open piston end 66 to communication with port 74, and exhausting pressure in line 28 and port 74 to atmosphere through hollow piston B. Once the air has been exhausted, valve C may move generally back to the position of FIG. 3 due to the stress in lip 86. Any slight leakage of air past lip 88 from port 74 will act on highly flexible lip 86 to engage same with surface 89 and snap valve C to the position of FIG. 5.

When the tractor and trailer lines are not connected, or in the event of a failure in the emergency lines, piston B is biased to the closed position of FIG. 2 so that application of the tractor brakes will not cause service air to bleed past valve C. The arrangement of lips 86 and 88 on valve C stabilizes valve C to minimize vibration. Lips 86 and 88 also increase the sensitivity of the valve because the absence of such lips may cause some air to bleed from port 74 past lip 86 when foot control valve 16 is closed and there would be a momentary delay in bleeding the air through open piston end 66.

The arrangement of valve C is useful in a valve having only ports 68 and 74. In such an arrangement, port 68 defines one port communicating past seat 70 and bore 72 with another port 74. Piston B may be considered an elongated hollow member or a movable member having an exhaust passage therein, with open end 66 defining an exhaust port. Open end 66 is positioned generally between seat 70 and other port 74. Flexible valve member C is positioned between seat 70 and open end 66. Valve member C is operative to establish communication between ports 68 and 74, while blocking communication between such ports and open end 66, upon application of a higher to lower pressure differential across valve C from one port 68 to other port 74. Valve C is operative to block communication between ports 68 and 74, while establishing communication between other port 74 and open end or exhaust port 66, upon application of a higher to lower pressure differential across valve C from other port 74 to one port 68. Circumferential lip 88 engages bore 72 between ports 68 and 74, and between port 68 and exhaust port 66.

The surface 89 of valve body 40 engaged by lip 86 may extend axially toward open piston end 66 from seat 70 to sufficient distance for stressing lip 86 sufficiently for moving valve C in following relationship to piston B as piston B moves from the position of FIG. 2 to the position of FIG. 3. The shape of lips 86 and 88 on valve C, along with their longitudinal spacing from one another, traps air between such lips to aid in minimizing vibration which produces noise due to horning.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. A valve comprising; a valve body having a hollow piston movable between first and second positions, said piston including an intermediate stepped portion, biasing means for normally biasing said piston to said first position, first and second ports communicating with one another past said stepped portion of said piston, third and fourth ports communicating with one another past one end portion of said piston, said piston having an opposite end portion communicating with atmosphere, movable valve means between said one end portion of said piston and said valve body for selectively blocking or establishing communication between said third and fourth ports and between said fourth port and the hollow interior of said piston past said one end portion thereof, said piston being movable from said first position to said second position under influence of pressure acting on said stepped portion thereof through said first port, in said first position of said piston said valve means being positioned for blocking communication between said third and fourth ports and between said fourth port and the hollow interior of said piston, in said second position of said piston said valve means being positioned for establishing communication between said third and fourth ports while blocking communication between said fourth port and the hollow interior of said piston upon application of pressure on said valve means through said third port and for establishing communication between said fourth port and the hollow interior of said piston while blocking communication between said third and fourth ports upon application of a higher to lower pressure differential across said valve means from said fourth port to said third port.

2. The valve of claim 1 wherein said valve body has a diaphragm valve member between said opposite end portion of said piston and atmosphere.

3. The valve of claim 1 wherein said valve body has a valve seat facing toward said one end portion of said piston and a bore extending from said valve seat to said fourth port, said third port being communicable with said bore past said valve seat, said valve means comprising a valve member of flexible material and including a valve member body portion having one side engageable with said seat and an opposite side engageable with said one end portion of said piston.

4. The valve of claim 3 wherein said valve member body portion includes a circumferential first lip extending longitudinally and radially outwardly therefrom adjacent said opposite side thereof and engaging said bore.

5. The valve of claim 4 including a circumferential second lip extending outwardly from said valve member body portion adjacent said one side thereof and engaging said valve body outwardly of said seat, and said second lip being stressed in said first position of said piston.

6. The valve of claim 3 including a circumferential lip extending outwardly from said body portion and engaging said valve body outwardly of said seat, and said lip being stressed in said first position of said piston.

7. The valve of claim 1 including a tractor-trailer air brake system including tractor service and emergency lines and trailer service and emergency lines, said first and second ports being respectively connected to said tractor emergency and trailer emergency lines, and said third and fourth ports being respectively connected to said tractor service and trailer service ports.

8. A valve including one port communicable past a seat and bore with another port, an elongated hollow member having one open end communicable with atmosphere and another open end positioned generally between said seat and said other port, a valve member of flexible material positioned between said seat and said other open end, said valve member being operative to establish communication between said ports while blocking communication between said ports and said other open end upon application of a higher to lower pressure differential across said valve member from said one port to said other port, and said valve member being operative to block communication between said ports while establishing communication between said other port and said other open end upon application of a higher to lower pressure differential across said valve member from said other port to said one port.

9. The valve of claim 8 including a circumferential lip extending outwardly from said valve member and engaging a surface of said valve outwardly of said seat, said lip normally being stressed in a direction tending to bias said valve member toward said other open end.

10. The valve of claim 9 including a second circumferential lip on said valve member engaging said bore between said ports and between said one port and said other open end.

11. The valve of claim 8 including a circumferential lip on said valve member engaging said bore between said ports and between said one port and said other open end.

12. The valve of claim 8 wherein said hollow member comprises a piston movable between a first position holding said valve member against said seat and a second position for releasing said valve member from engagement with said seat.

13. The valve of claim 12 including a circumferential lip extending outwardly from said valve member and engaging a surface of said valve outwardly of said seat, said lip being stressed in said first position of said piston in a direction tending to move said valve member away from said seat when said piston moves toward said second position.

14. The valve of claim 12 including a circumferential lip extending outwardly from said valve member and engaging said bore between said ports and between said one port and other open end.

15. In a tractor-trailer air brake system having tractor emergency and service lines and trailer emergency and service lines, a shutoff and exhaust valve respectively connecting said tractor and trailer emergency lines and said tractor and trailer service lines, said valve having a movable member which is movable between a first position blocking communication between said tractor and trailer service lines and a second position providing communication between said tractor and trailer service lines, biasing means for normally biasing said movable member to said first position, said movable member being movable to said second position under influence of a predetermined pressure acting thereon through said tractor emergency line, said valve having an exhaust port of establishing communication of said trailer service line with atmosphere, diaphragm valve means positioned between said tractor and trailer service lines and said exhaust port, said valve means being operative in said second position of said movable member to establish communication between said tractor and trailer service lines while blocking communication of said service lines with said exhaust port upon application of a higher to lower pressure differential across said valve means from said tractor service line to said trailer service line, and said valve means being operative in said second position of said movable member to block communication between said tractor and trailer service lines while establishing communication between said trailer service line and said exhaust port upon application of a higher to lower pressure differential across said valve means from said trailer service line to said tractor service line.

16. The system of claim 15 wherein said movable member comprises a piston having said exhaust port therein.

17. The system of claim 16 wherein said valve means includes a circumferential lip extending outwardly therefrom and engaging a surface of said shutoff and exhaust valve, said lip being resiliently stressed in said first position of said movable member in a direction tending to bias said valve means toward said movable member as said movable member moves toward said second position.

18. The system of claim 17 including a second outwardly extending circumferential lip on said valve means engaging a surface of said shutoff and exhaust valve between said tractor and trailer service lines and between said tractor service line and said exhaust port.

19. The system of claim 16 including an outwardly extending circumferential lip on said valve means engaging a surface of said shutoff and exhaust valve between said tractor and trailer service lines and between said tractor service line and said exhaust port.

* * * * *